Patented Feb. 11, 1930

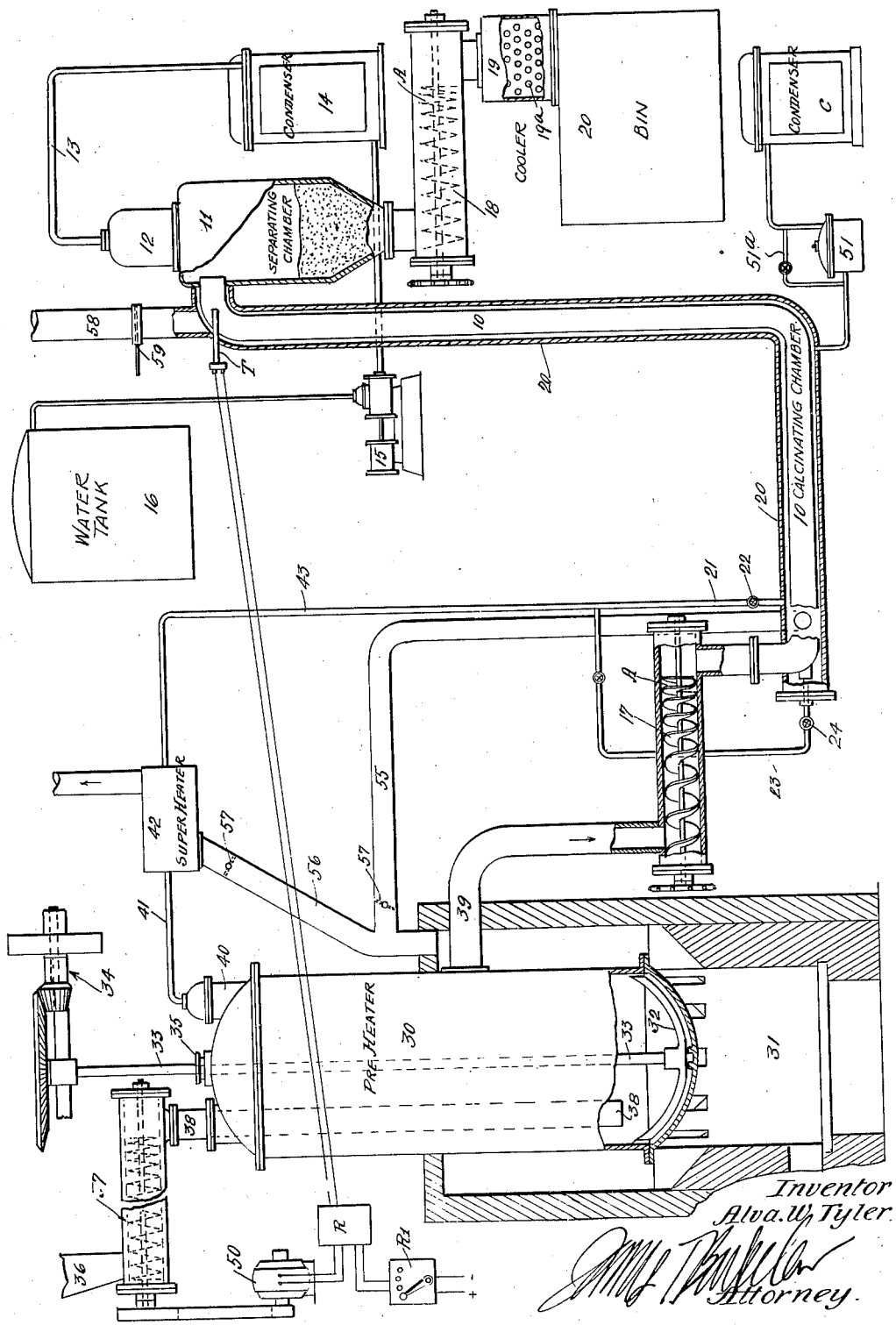

1,746,294

UNITED STATES PATENT OFFICE

ALVA W. TYLER, OF MONTEREY PARK, CALIFORNIA

CONTINUOUS CALCINATION OF GYPSUM

Application filed June 2, 1926. Serial No. 113,126.

This invention has to do with the calcination or decomposition of materials that may be broken down by the heat; and more specifically, but not limitedly, to the calcination or dehydration (wholly or partially) of gypsum for the manufacture of gypsum plaster or stucco.

In a previously filed application, Serial Number 53,478, filed August 31, 1925, I have described method and apparatus whereby gypsum or other material may be continuously heat treated and gypsum may be continuously calcined, the method there described including characteristically the mobilization and moving of the gypsum through a comparatively long calcining chamber by the use of a hot mobilizing gas and preferably by the use of superheated steam. Said application also describes the separation of the gypsum from the mobilizing steam or gas, and the water vapor evolved by calcination, before final cooling of the gypsum. Further it describes certain features of apparatus and mechanism adapted for such a method.

It will be understood that the term "mobilize" will be used herein in the sense of both rendering capable of movement and also causing movement. In other words, the mobilizing fluid both fluidizes the gypsum and is one of the causes of its movement.

The present invention has particularly to do with improvements and extensions upon said method and apparatus, characteristically, but not exclusively, the preheating of gypsum in a calcining kettle or the like, the generation of steam during that preheating, which is carried to the point of partial calcination, and driving off of water vapor, and the use of that steam for the purpose of heating and mobilizing the same gypsum, for carrying it through the final part of its calcination. The following description will therefore be devoted most particularly to the improvements which are the subject matter of this present application and will only describe the original process in so far as it is necessary to a complete understanding of this improvement.

In the drawings the single figure is a diagrammatic representation of an apparatus suitable for carrying out the method herein described.

In these drawings there is represented at 10 a tube or pipe forming the final calcination chamber. In the particular apparatus arrangement here shown this pipe has first a horizontal run and then a vertical run up to the upper part of a separating chamber 11 capped at its upper end with a steam dome 12 from which steam pipe 13 leads to a condenser 14, and a pump 15 may take water from the condenser and put it into a tank 16. Although what is done with the steam after it leaves the steam dome is immaterial so far as this invention is concerned, in most localities where gypsum plaster is manufactured, it is desirable to conserve water as far as possible.

A cased spiral conveyer 17 delivers gypsum into the intake end of calcining tube 10, this spiral conveyer being of a gradually decreasing pitch so that at its end, at a point marked A in the drawings, the gypsum (at least partially dehydrated, as will be hereinafter explained) is forced up into a plug, or more or less solid mass capable of holding whatever pressure it may be desired to use in the calcining chamber. Likewise at the bottom of separating chamber 11 another small conveyer 18 takes the gypsum off and, at about the point indicated A, forms another plug or solid mass for the purpose again of holding pressure, and further specifically for the purpose of preventing steam or water vapor in chamber 11 from having any substantial exit through the conveyer along with the gypsum. The water vapor and gypsum separate in chamber 11, the steam going off through dome 12 and the gypsum falling to the bottom. It is only after the gypsum has passed the point A in conveyer 18 that it goes to cooler 19 where it is cooled out of contact with all water vapor, so that upon cooling and upon going to bin 20 the gypsum remains in its required dehydrated state, as it has had no opportunity to take up water after being cooled below the calcining temperature. Cooler 19 may be of any suitable type; it is shown as a structure like a water-tube condenser, with tubes $19^a$. It will be understood that the method is so carried on that whatever gypsum there is in chamber 11 or in conveyer 18, where it might be in contact with water vapor, is at least still above the temperature point that may be denoted the lowest calcining temperature of gypsum. The practical temperature at which gypsum freely calcines is about 250° F., but in order to produce the required quality of calcined gypsum for plastering purposes it is necessary to carry the finishing temperature to about 330° F. The higher the finishing temperature the more water of crystallization is driven off and the denser the plaster product becomes when re-hydrated. When finishing temperatures about 500° F. or 600° F. are reached, practically all the water of crystallization is driven off and rehydration occurs with such difficulty that the material has no practical value as a plaster. Practical finishing temperatures run from about 330° F. to 380° F. or even to 420° F. The great bulk of what is ordinarily known as "calcined gypsum" and used for all regular plastering purposes, however, is calcined at about the finishing temperature noted above (330° F.) and at that temperature still retains about 5% to 6% of its water of crystallization. Variation in the purity of the raw gypsum will naturally vary the total quantity of water of crystallization in a given quantity of the material and will likewise vary the percentage of water remaining in the calcined material. Different qualities of raw gypsum rock may require different finishing temperatures to give the required degree of calcination and therefore when "calcining temperature" is spoken of in this specification I mean that temperature at which it is necessary to finish a given pulverized gypsum material in order to give the required degree of calcination, or in other words that degree of calcination which produces the highest quality of calcined product for the purpose it is to be used. Calcining chamber 10 has a surrounding steam jacket 20 into which steam is introduced through pipe 21 under control of valve 22, and steam is introduced to the intake end of tubular chamber 10 through a pipe 23 under control of valve 24. The steam introduced through pipe 23 to the tubular calcining chamber mobilizes the finely divided gypsum fed into that chamber and causes the whole mixture to move as a fluid. What I here call mobilization may be explained as follows: The steam mingles with the finely divided gypsum to form a more or less fluid mixture. This fluid mixture flows along the tube due to the introduction of gypsum at the feed end and it may be, in some cases, due to a difference in steam pressure at the feed end and the discharge end. The steam pressure may be very low; and even where its pressure is used as one of the means for moving the gypsum through the chamber, its pressure need be no more than that necessary to move the mixed column of steam and gypsum and overcome its frictional resistance with the chamber walls. The steam introduced as a mobilizing agent to calcining chamber 10 not only mobilizes the gypsum but also, at least to a certain extent, heats it for the purpose of calcination and that the steam introduced to the steam jacket also heats the gypsum by heating the calcining chamber externally. Either one or the other of these heating mediums may be used, or other external method of heating but I prefer to use both, preferring to use a minimum amount of steam as a mobilizing agent and to supply the rest of the necessary heat (if the heat in the mobilizing steam is not sufficient) by the external steam jacket. As will be readily understood, the question as to whether the heat of the mobilizing steam is sufficient for complete calcination of the gypsum depends upon the amount of steam used in proportion to the amount of gypsum being calcined and depends also upon the degree to which the gypsum has been partially calcined by its preheating before introduction to the final calcining chamber 10, and also upon the degree of superheat given to the steam before its use as a mobilizing agent. The steam is superheated to raise its temperature above that of the gypsum being calcined and also because, as more heat is put into the steam, more heat can thereby be transferred, and also because then the mobilizing steam in the calcining chamber need never become wet, the operations being so regulated and maintained that the superheated steam never cools to or below the saturation point.

As an instance, I may say that the steam may be superheated to about 375° F., and only sufficient of that steam be put into tube 10 to mobilize the gypsum. Then a sufficient quantity of the superheated steam will be put through jacket 20 to supply the calcining heat requirements over and above what is supplied by the mobilizing steam, and to maintain an efficient calcining temperature of, say 350° F., in the calcining chamber.

The heating steam in the steam jacket may be allowed to condense if desired and the water passed off through trap 51; the latent heat being thus utilized. In such a case the steam pressure may be maintained high enough that condensate does not fall below the calcining temperature maintained in chamber 10.

The foregoing is briefly a description of the method and apparatus substantially as set forth in said prior application. The following part of this description has to do with the characteristic improvements which are the subject matter of the present application.

In the drawings I show at 30 a gypsum preheater in the form of a closed gypsum calcining kettle set in a furnace 31 and having a rotary stirrer 32 near its bottom operated by a vertical shaft 33, driven by any suitable means such as indicated at 34. Shaft 33 passes through a stuffing box 35 in the top of the kettle so as to maintain steam-tight conditions. Raw gypsum is introduced from a bin or spout 36 to a cased positive feeder or spiral conveyer 37 of the same type as before explained, this positive feeder feeding the gypsum to an intake tube 38 preferably extending to a point near the bottom of the kettle so that the raw gypsum is fed in at the bottom where its generated steam will rise through the upper parts of the partially calcined gypsum mass and keep that mass hot, also prevent it from caking down into a solid body. When gypsum is fed into the bottom of the kettle in this manner it develops into a more or less fluffy mass during calcination and it is more or less easily handled. In fact, it will flow readily through the overflow pipe shown at 39 leading from the kettle to the positive feeder 17. The top of kettle 30 may have a steam dome 40 and a steam pipe 41 leads to a superheater 42 heated by the flue gases from furnace 31, as will be evident from the drawing. From superheater 42 a steam pipe 43 leads to the steam pipes 21 and 23 hereinbefore referred to.

In the operation of the described apparatus the raw gypsum is fed into the preheating kettle 30 at a suitable rate determined from practice, and as soon as the heating kettle is filled up to the overflow pipe 39, then the partially dehydrated gypsum begins to flow over into positive feeder 17. A suitable gypsum temperature, less than the final or finishing temperature of the gypsum, will be maintained in the preheating kettle 30 to at least partially dehydrate and partially calcine the raw gypsum. For instance, a gypsum temperature of say 250° F., or more, may be there maintained and, depending upon what that temperature may be, a certain amount of the water of combination is driven off from the gypsum in the form of saturated steam; and steam pressure may be raised in the preheating kettle somewhat less than the water vapor tension corresponding to the temperature maintained (as an illustration, somewhat less than fifteen pounds gauge for 250° F.). Thus from the preheating kettle there are two things obtained to be used further in the process: (a) the partially dehydrated and preheated gypsum, and (b) steam at a certain temperature and at a pressure corresponding to that temperature. The steam goes immediately to the superheater where it is super-heated to such a temperature that the total heat then carried by the steam is sufficient or more than sufficient to complete the dehydration and calcination of the gypsum in the final calcining chamber 10. The temperature to which the steam is raised in the superheater may thus be, as I have before indicated, dependent upon the volume of that steam and upon the amount of heat necessarily imparted to the gypsum during the final step of complete calcination; and of course the volume of steam in proportion to the amount of gypsum being calcined will depend upon the degree to which calcination has been carried on in the preheating kettle. The actual operating temperatures are determined by such considerations, among other things; it being borne in mind that enough steam is driven off in the first operation to carry the heat required for the second.

It will be understood that either the preheater 30 or calcining chamber 10, or both, may be operated at pressures other than atmospheric. It may not be necessary that such pressure or pressures be above normal atmospheric pressure; in fact they may be atmospheric or even sub-atmospheric. Sub-atmospheric pressure applied to preheater 30 of course facilitates generation of water vapor; and such a sub-atmospheric or any other pressure may be maintained in preheater 30 by any suitable means, for instance by proper control and operation of such a condenser as shown at C, by-passed as at 51$^a$ around trap 51 for the purpose. In such case it would of course be necessary to maintain the same or a somewhat lower pressure on calcining chamber 10; which can be done by proper operation of condenser 14. In such case the steam will not be wholly condensed in jacket 20; but the temperature of steam in jacket 20 will be kept up by proper operation of superheater 42.

Likewise, to maintain any desired pressure in calcining chamber 10 condenser 14 may be properly regulated and operated in conjunction with regulation of steam admission valve 24. Thus any suitable pressure may be maintained in preheater 30 and calcining chamber 10, and such pressures may be, if desired, maintained independently of each other. Ordinarily, of course, the pressure in calcining chamber 10 will be somewhat lower than in preheater 30 so that steam from the preheater will flow into the calcining chamber to mobilize the gypsum therein.

For instance, using the illustration of 250° F. and fifteen pounds pressure in the preheater, the pressure in 10 may be ten or twelve pounds per square inch, and the pressure in the separator 11 still less, or even sub-atmospheric, depending on the operation of the condenser. The temperature in the separator 11 would, in the illustration given, be about the same as the operating calcining temperature in 10; that is, about 350° F. or perhaps less, due to heat radiation.

I may also state that in a broad aspect of my invention it may not be necessary to use steam from preheater 30 for externally heating calcining chamber 10, although that is the preferred manner of externally heating that chamber. That chamber may, however, be externally heated by any other suitable means. For instance, if the operations are carried on in such a way that the volume of steam from heater 30 is not sufficient to both mobilize the gypsum in calcining chamber 10 and to supply all the necessary heat for the final calcination, waste heat from the furnace or preheater 30 may be put into jacket 20 by way of a flue 55 leading from stack 56, dampers 57 being properly regulated; and in that case the final discharge stack 58 leading from the upper end of jacket 20 will be opened, as it may be by operation of a suitable valve or gauge 59.

Initial feeder 37 is preferably driven in such a manner that its speed may be varied to suit the rate at which the preheating and calcining apparatus will take care of the gypsum. Thus, for instance, feeder 37 may be driven by a variable speed motor 50 which may be controlled by an automatically controlled rheostat R and also by a hand controlled rheostat $R^1$, as illustrated. Rheostat R may be controlled in its action by a thermostat T set in the end of calcining chamber 10; the parts being so designed and regulated that the falling off of temperature of the finished gypsum below the proper finishing calcining temperature will cause rheostat R to operate to slow down motor 50 and thereby slow down the feed of gypsum to the preheater. Thus an automatic control is provided that will prevent overfeeding of gypsum and thereby prevent under-calcination. At the same time the same apparatus, in case the temperature should rise above the proper finishing calcining temperature, will act to speed up the motor and the feeding of gypsum.

I claim:

1. In a method of calcining gypsum, the steps of preheating raw gypsum to temperatures below final calcining temperatures whereby substantial amounts of moisture are driven off in the form of saturated steam, superheating the said steam and, by means of said super-heated steam, both moving the preheated gypsum through a calcining zone and simultaneously calcining the said gypsum.

2. In a method of continuously calcining gypsum, the steps of continuously preheating raw gypsum to temperatures below final calcining temperatures whereby substantial amounts of moisture are driven off in the form of saturated steam under pressure, superheating the said steam and, by means of a current of the said superheated steam, both moving the preheated gypsum through a calcining zone and simultaneously calcining the said gypsum.

3. Apparatus for calcining gypsum comprising a preheating kettle and means for heating the same, a gypsum feed pipe having its outlet in said kettle near the bottom thereof, means cooperating with said pipe to force raw gypsum into said kettle against a positive pressure therein, a steam outlet pipe connecting the top of said kettle with a superheater, a tubular, jacketed calcining chamber having inlet and outlet ends, a gypsum overflow pipe connecting the said kettle above the level of the gypsum feed pipe outlet with the inlet end of said calcining chamber, means in said overflow pipe for forcing preheated gypsum from said kettle to the calcining chamber, a conduit connecting the superheater with the inlet end of the calcining chamber, a second conduit connecting said superheater with the jacket of the calcining chamber, a separator connected with the outlet end of said chamber for separating vapors from calcined gypsum and means for withdrawing and subsequently condensing said vapors, means for cooling the calcined gypsum out of contact with air, and means for feeding calcined gypsum from the lower part of said separator to the cooling means, including a conduit having therein an Archimedian screw conveying device.

4. Apparatus for calcining gypsum comprising a preheating kettle and means for heating the same, a gypsum feed pipe having its outlet in said kettle near the bottom thereof, a steam outlet pipe connecting the top of said kettle with a superheater, a tubular calcining chamber having inlet and outlet ends, a gypsum overflow pipe connecting the said kettle above the level of the gypsum feed pipe outlet with the inlet end of said calcining chamber, means in said overflow pipe for forcing preheated gypsum from said kettle to the calcining chamber, a conduit connecting the superheater with the inlet end of the calcining chamber, a separator connected with the outlet end of the said calcining chamber for separating vapors from calcined gypsum, means for withdrawing the vapors, means for cooling the calcined gypsum out of contact with the air, and means for feeding calcined gypsum from the lower part of said separator to the cooling means.

In witness that I claim the foregoing I have hereunto subscribed my name this 24th day of May, 1926.

ALVA W. TYLER.